April 30, 1968     R. J. CARBONE ETAL     3,381,136
INTERFEROMETRIC FLUORESCENT LIFETIME MEASURING ARRANGEMENT
Filed June 17, 1964
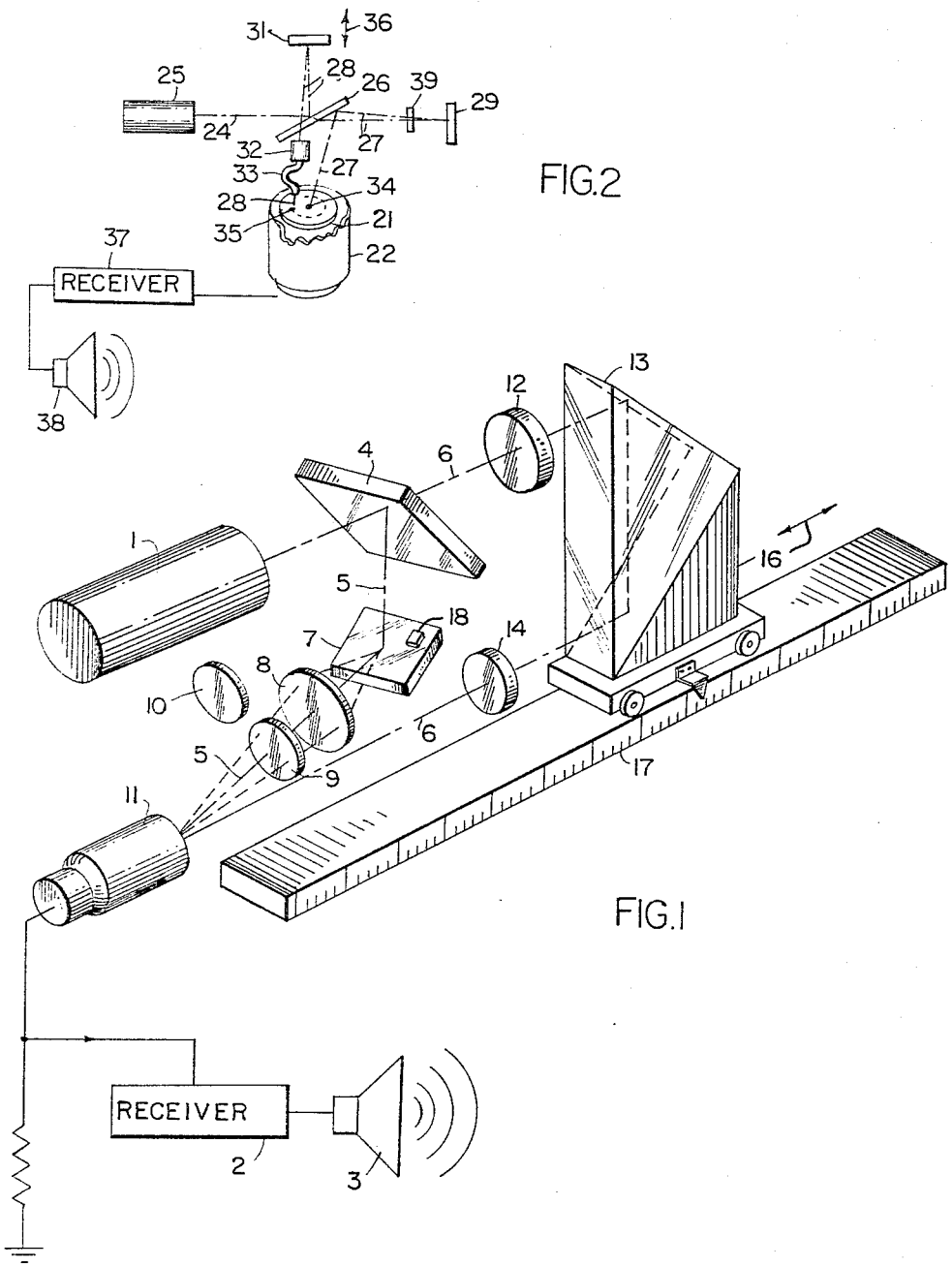
INVENTORS:
ROBERT J. CARBONE
PERRY R. LONGAKER
BY,
*Robert T Dunn*
ATTORNEY

United States Patent Office 3,381,136
Patented Apr. 30, 1968

3,381,136
INTERFEROMETRIC FLUORESCENT LIFETIME MEASURING ARRANGEMENT
Robert J. Carbone, East Derry, N.H., and Perry R. Longaker, Acton, Mass., assignors to Massachusetts Institute of Technology, Cambridge, Mass., a corporation of Massachusetts
Filed June 17, 1964, Ser. No. 375,761
6 Claims. (Cl. 250—220)

ABSTRACT OF THE DISCLOSURE

The interval of time associated with the occurrence of a physical phenomena is measured by directing radiation from a single source along each of two paths and detecting the phase difference between radiation at the end of each path with and without the occurrence of said phenomena in one of said paths.

---

This invention relates to delay measuring systems and more particularly to a method and means for measuring extremely short intervals such as the fluorescent lifetime of a material.

Heretofore, optical or electrical pulsing techniques have been employed to measure delays such as the fluorescent lifetime or decay time of a material. In such systems, pulses of illuminating radiation or electrical pulses are directed to the material and pulses of the resulting fluorescent radiation emitted from the material are detected. The time separation between the illuminating pulses and the detected pulses is indicative of the fluorescent lifetime and is generally limited to measurements greater than $10^{-8}$ seconds. The limitation is imposed principally by the difficulty of measuring pulse separations of less than $10^{-8}$ seconds with a satisfactory degree of accuracy.

The same problem arises when measuring the response time of a photoemissive material and more particularly the variation in response time from point to point about the surface of the photoemissive electrode in a phototube. It is one object of the present invention to provide a system capable of accurately measuring delays or intervals such as fluorescent lifetime or response time of a material.

It is another object of the present invention to provide a system for measuring such intervals whereby relatively simple mechanical measurements can be made to yield an accurate determination of intervals of $10^{-8}$ seconds or substantially less.

Various embodiments of the present invention incorporate phenomena which occur when two modes of light from a laser strike photoemissive or fluorescent material. For example, when the beam from a laser operating with the mirror spacing to give stable optical modes is projected on the cathode of a photomultiplier it will produce a signal within the electronic structure of the tube at the difference frequency between these optical modes. The excitation of a fluorescent material by the same laser beam produces fluorescent light which is also modulated by the difference frequency between the optical modes provided the period of the difference frequency is greater than the fluorescent lifetime of the material. Various embodiments of the present invention incorporate one or both of these phenomena to provide systems for precisely measuring time intervals at least as short as $10^{-11}$ seconds which define fluorescent lifetime or photoemissive response time.

It is a principal feature of the present invention to direct coherent light of two separate frequency bands along each of at least two different paths, at least one of which is variable in length, to a material which responds to the two separate frequency bands by combining the frequencies to produce a difference frequency or beat frequency signal associated with each of the different paths and then comparing the phase of the different beat signals while adjusting the length of one of the paths to determine relative delay interval, fluorescent lifetime or photoemissive response time of the materials.

It is a feature of one embodiment of the present invention for measuring fluorescent lifetime to employ an interferometric phase shift technique including two separate radiation or light paths emanating from a common coherent source, and terminating at a detector and to delay signals carried by light along the first of these paths by the fluorescent lifetime or decay time of a subject material so that the light directed along each path to the detector will provide an interference signal at the detector. The change that must be made in the length of one of the light paths to produce the same interference signal at the detector with and without the subject material in one of the paths is related to the fluorescent lifetime of the subject material.

Another feature of the same embodiment is to illuminate the subject material with at least two modes of light from a laser with the result that the fluorescent light emitted from the material is modulated at the difference frequency between the two modes. This fluorescent light is directed to a phototube. The same two modes of laser light are also directed along a path of variable length to the same phototube and mixed at the phototube cathode generating a beat frequency in the electron flow within the phototube equal to the modulation frequency. A null is produced when the modulation of the fluorescent light is in opposite phase to the beat frequency modulation on the phototube current.

In an embodiment for measuring variations in response time about the surface of a photoemissive electrode, both radiation paths terminate at the surface of the electrode, one at a reference point and the other at selected points. Variations in the adjusted length of one of the paths required to produce a null in beat frequency modulations on the electron flow from the electrode are noted at each selected point and provide an indication of response time from point to point relative to the response time at the reference point.

Other features and objects of the invention will be apparent from the following description taken in conjunction with the figures in which:

FIGURE 1 is a perspective view showing relative locations of parts in a system for measuring fluorescent lifetime; and FIGURE 2 illustrates a system for testing the uniformity of response to incident radiation over the face of, for example, the cathode in a phototube.

In accordance with a specific embodiment of the present invention for measuring fluorescent lifetime of a material, a helium-neon gas laser serves as the source of two narrow band beams of light which are in fact different axial modes of the laser. These beams are first directed along two separate paths producing beat frequency signals at the cathode of a photomultiplier which are combined in the output of the photomultiplier. One of the paths is adjusted in length until a null is produced in this output. The null occurs when the two paths differ in length by an odd number of ½ wavelengths of the beat frequency. It is then only necessary to adjust the intensities of the beams along each of the paths to produce a complete null of the beat frequency in the output from the photomultiplier. Next, a sample of the fluorescent material is placed in one of the light paths so that the laser light impinges upon it and fluorescent light modulated at the beat frequency is emitted from it and directed to the cathode of the photomultiplier. This action upsets the null. Next, the length of the other light path is altered to again achieve a null in the beat frequency at the output of the photomultiplier. The altered length of this path is functionally related to the fluorescent lifetime of the sample as shown below.

A more specific understanding of principles of the invention can be had from the following:

The rate equation for a fluorescent process is given by $$dn/dt = -n/\tau + g \cos \omega t \quad (1)$$

where $n$ is the number of excited states and $\tau$ is the lifetime of the states.

The term $g \cos \omega t$ is the modulation of the population density in the fluorescent level at $\omega$, the angular rate of the difference frequency between the optical modes. In accordance with the present invention, both optical modes from the laser strike the fluorescent material. Since fluorescent population is proportional to the square of the optical fields of this impinging light, there will occur a signal at the difference frequency to drive the fluorescence. This difference frequency is $\omega$.

Equation 1 can be solved to yield the following:

$$n = g\tau(1+\omega^2\tau^2)^{\frac{1}{2}} \cos(\omega t - \phi) \quad (2)$$

where $$\phi = \tan^{-1} \omega \tau \quad (3)$$

indicating that the phase shift introduced by the fluorescent lifetime must lie between zero and $\pi/2$.

The phase shift produced by change in null position of the interferometric system is given by equation $$\phi = 2\omega x/c \quad (4)$$

where $x$ is the length the light path must be changed to yield a null. Combining Equations 3 and 4 yields $$\tau = (1/\omega) \tan 2\omega x/c \quad (5)$$

and when $\omega x/c$ is very small this becomes $$\tau = 2x/c \quad (6)$$

FIGURE 1 illustrates an embodiment of the invention for measuring fluorescent lifetime of gallium arsenide as indicated by the analysis above. The system includes a helium neon gas laser 1, which is preferably operated at 6328 A. with a mode spacing which gives stable optical modes 155 megacycles apart. A receiver 2 is turned to accept 155-megacycle signal which is mixed in the receiver to produce an audio beat, energizing a speaker 3. A null in the 155-megacycle beat frequency is detected as a null in the audio signal from the speaker. The light beam from the laser 1 is directed to a Brewster angle beam splitting mirror 4 which splits the beam along two paths 5 and 6. Most of the light from the laser beam is preferably directed along path 5 which at first includes a simple mirror 7 reflecting the light through a lens 8 and a filter 9 to the cathode of a photomultiplier tube 11.

Along the second light path 6 are located a rotatable polarizer which performs as a variable attenuator of the light, a prism 13 for directing the light toward the photomultiplier, and a filter 14. The filters 9 and 14 in the paths 5 and 6, respectively, serve to remove extraneous light from the paths.

The prism is mounted on a carriage 16 equipped to be movable along a scale 17, thus increasing or decreasing the length of the light path 6. At the commencement of the test, the prism 13 is located so that a null is produced in an audio output from the speaker 3. Next, the plane mirror 7 is replaced by a flat piece 18 of the fluorescent material (gallium arsenide) whose fluorescent lifetime is to be measured and filter 9 is replaced by a filter 10 which passes substantially only the fluorescent light from the material. The beam 5 strikes the fluorescent material which produces a spread of fluorescent light indicated by the broken lines emanating toward the lens 8. The lens focuses this light through the filter 10 to the cathode in the photomultiplier 11. Some of the light in the beam 5 which is reflected directly from the fluorescent material is attenuated by the filter 10. However, a substantial part of the 6328 A. laser light causes fluorescent radiation which is totally contained in a narrow band peaked at 8690 A. The filter 10 is preferably designed to pass only this 8690 A. fluorescent light.

The fluorescent light is amplitude modulated at the difference frequency between optical modes of the 6328 A. light issuing from the laser, and so it is amplitude modulated at 155-megacycles/sec. and produces a 155-megacycle/sec. modulation on electron flow from the cathode of the photomultiplier 11. The light from beam 6 also produces a 155-megacycle modulation on this electron flow, however these 155-megacycle modulations are no longer in opposite phase and so a null is not produced in the audio output from the speaker 3.

Two steps are required to produce a null at this stage of operation. First, it is necessary to alter the length of the path 6 by moving the prism 13 on its carriage 16 along a scale 17 so that the two 155-megacycle/sec. modulations at the cathode of the photomultiplier are in opposite phase. It is also necessary to alter the attenuation of the light in path 6 so that the intensity of the beat frequency produced by the two laser modes of the 6328 A. light along path 6 which strikes the cathode of the photomultiplier is equal to the intensity of the 155 modulation on the 8690 A. fluorescent light at the cathode of the photomultiplier. This is accomplished by varying the rotatable polarizer 12 to provide suitable attenuation of light in path 6. The distance $x$ is then determined as the change in position of the prism 13 along the scale 17.

The system and method described above is suitable for measuring the lifetime of a single decay process. If, however, the sample material selected fluoresces at a multitude of different fluorescent bands whose lifetimes may differ, suitable filtering must be added between the sample and the photomultiplier so that each fluorescent band may be examined separately.

The measurement of longer and longer fluorescent lifetimes is best accomplished by employing lasers which produce optical modes separated by lower difference frequencies (with due consideration of the exciting frequency requirements of the fluorescent material). If this is carried even further, in some cases it may be more practical to replace the laser by an externally modulated beam of incoherent light. On the other hand, the shortest lifetime that can be accurately measured is determined by how accurately the null of the interferometer can be set. This is primarily a mechanical problem and can be eased by selecting a relatively long difference frequency wavelength within the limits of available laser device.

In some applications of the above embodiment, it is not practical to detect the laser beam radiation and radiation from the sample with the same detector, because the decay process of the given physical system may not be radiative, and may relax by other processes (e.g. productions of phonons, etc.). Therefore, a photomultiplier could be used for the laser beam and another type detector used for the sample. The outputs from these detectors are then combined in a circuit which is selectively coupled to a receiver. More specifically, the laser beam is directed to a photoconductive sample of, for example, GaAs and parallel conducting plates attached thereto are used to pick off the modulation of the conductivity produced by the signal carried by the laser beam. This signal is then combined with the signal carried by the laser beam along a second path and is detected with a photomultiplier. Then one or the other of these detected signals is phase shifted by, for example, adjusting the second path length, to produce a null in the combining circuit and which is observed as a nulled D.C. signal or nulled audio signal in the manner described above with respect to FIGURE 1. Thus, the decay time associated with the photoconductive processes in the sample of GaAs is determined as a function of the change in path length.

FIGURE 2 illustrates another embodiment of the invention by which uniformity of response over the area of a radiation sensitive electrode is measured. The radiation sensitive electrode 21 is, for example, the cathode in a phototube 22 and is subject to two narrow beams of radiation of substantially the same intensity and spectrum both issuing from the same source to that each has the same envelope. One beam serves as a reference or standard and is preferably directed to the center of the responsive face of the electrode 21 while the other is directed to selected points about the face of the electrodes and both beams generate a signal within the phototube which are combined in the tube output. These signals will combine to cancel when the envelopes of the incident beams at the face of the electrode are in opposite phase and the response of the electrode at the points of incidence are identical.

As illustrated in FIGURE 2, a beam 24 from a He-Ne gas laser 25 with mirror spacing to give two stable optical modes is split by a mirror 26 into two beams 27 and 28. Beam 27 is reflected from a fixed mirror 29 back to the mirror 26 upon which it is incident at an angle of approximately 45° and from there to the center 34 of the sensitive face of electrode 21 where the two modes combine producing a beat frequency modulation on electron flow within the phototube 22. This modulation is referred to herein as the reference signal.

The second beam 28 reflects from a movable mirror 31 back through the mirror 26 to a lens system 32 which directs the beam to a flexible light conducting tube 33 which may be a fibre optics device of invariant light path length. The flexible quality of this device permits an operator to direct the beam 28 to various points, such as 35, about the face of the electrode 21 where the two laser modes which make up the beam are combined producing a beat frequency modulation on electron flow within the phototube 22. This modulation is referred herein as the test signal.

Since the reference signal and the test signal are the same frequency and intensity, they combine within the phototube to cancel or reinforce depending upon the difference in effective path lengths between the paths 27 and 28 and difference in response between points 34 and 35.

In operation both beams 27 and 28 are first directed to the center 34 of the electrode 21 and the position of mirror 31 is varied along the direction of the arrow 36 until the beat frequency in the output of the phototube 22 is cancelled. This beat frequency is detected by a receiver 37 which converts it to audio and feeds the audio to a speaker 38. In order to obtain complete cancellation, it may be necessary to attenuate beam 27 somewhat. For this purpose a rotatable polarizer 39 is provided in path 27.

Next the operator manipulates the flexible light conductor tube 31 so that beam 28 is directed to any other selected point such as point 35. Then mirror 31 is moved to alter the effective length of path 28 until a null in the beat frequency is again produced in the output of the phototube. Again, it may be necessary to adjust the attenuation of beam 27 by rotating the polarizer 39 to produce a complete null. The change in length $x$ of path 28 is related response time difference $\Delta\tau$ between the points 34 and 35 by the equation $$\Delta\tau = x/c$$

where $c$ is the velocity of the radiation.

This completes a description of a few embodiments of the present invention which include a source of radiation which is split along two separate paths, one including a delay to be measured and one being variable in length with means at the end of each of the paths for frequency mixing radiation from each path to produce a beat frequency signal associated with each path and means for comparing the beat frequency signals to yield a signal indicative of variations in the length of the variable path, these variations being related to the measured delay. These embodiments, however, are described only by way of example and do not limit the spirit and scope of the invention as set forth in the accompanying claims.

What is claimed is:

1. A system for measuring the time interval associated with the occurrence of a phenomena comprising a source of radiation, means for directing said radiation along two separate paths, means in one of said paths for producing said phenomena in response to said radiation from said source, said phenomena producing means being such that radiation issues therefrom along the remainder of said path to the end thereof, means for varying the effective length of one of said paths, means at the end of each of said paths for comparing the phase of radiation at the end of one of said paths with the phase of radiation at the end of the other of said paths and means responsive thereto for producing a signal indicative of the phase difference between radiation at the end of each of said paths with and without the occurrence of said phenomena in one of said paths.

2. A system for measuring the fluorescent lifetime of a material comprising a source of radiation, means for directing said radiation along two separate paths, fluorescent material in one of said paths, means for varying the length of one of said paths, means for comparing the phase of radiation at the end of each of said paths, means responsive thereto for producing an output signal representative of the difference in phase between radiation at the ends of said paths and means for measuring the difference in the length of said one path required to produce substantially the same output signal with and without said fluorescent material in one of said paths.

3. A system for measuring the fluorescent lifetime of a material comprising, means for producing along each of two separate paths beams of radiation of different frequencies separated in frequency by a predetermined difference frequency, fluorescent material located in one of said paths, means at the end of each of said paths for detecting and combining said difference frequency associated with each of said paths, means for altering the length of one of said paths so that said difference frequencies combine and substantially cancel with and without said fluorescent material in one of said paths and means for measuring the change of length of said alterable path required to cause said cancellation with and without said fluorescent material in one of said paths.

4. A system for measuring the fluorescent lifetime of a material comprising, means for producing along separate paths concentric beams of radiation of different frequencies separated in frequency by a predetermined difference frequency, fluorescent material located in one of said paths, means at the end of each of said paths for detecting and combining said difference frequency associated with each of said paths, said combining means producing an output signal representative of the phase difference between said difference frequencies associated with said paths, means for altering the length of at least one of said paths so that said difference frequencies substantially cancel, means for inserting said fluorescent material in one of said paths and means for measuring the change of length of said alterable path required to produce the same magnitude of said output signal with and without said fluorescent material in one of said paths, yielding a value representative of said fluorescent lifetime.

5. A method for measuring the fluorescent lifetime of a fluorescent material comprising the steps of providing at least two separate optical paths between a source of coherent radiation carrying a signal and a radiation detector for detecting the signal carried along each of said paths, detecting said signals, combining said detected signals, varying the length of at least one of said paths so that said detected signals combine and cancel, inserting a sample of said fluorescent material in one of said paths, varying the length of said variable length path so that said signals again combine and cancel and measuring the change in length of said variable length path, said change in length being representative of said fluorescent lifetime.

6. A method for measuring the fluorescent lifetime of a fluorescent material comprising the steps of providing two separate optical paths between a source of coherent radiation operating at two stable optical modes separated by a difference frequency and a radiation detector, detecting said difference frequency at the end of each of said paths, detecting the phase difference between said detected frequency differences associated with said two paths and producing a phase difference signal, varying the length of one of said paths to null said phase difference signal, inserting a sample of said fluorescent material in one of said paths, varying the length of said variable length path to again produce a null in the detected difference frequency and measuring the change in length of said variable length path.

References Cited

Introduction to Physical Optics, by John Robertson, Van Nostrand Co., New York, 1947, pp. 243–244.

RALPH G. NILSON, *Primary Examiner.*

M. ABRAMSON, *Assistant Examiner.*